United States Patent [19]

Hums

[11] Patent Number: 5,744,113

[45] Date of Patent: Apr. 28, 1998

[54] PROCESS AND CATALYST FOR DECOMPOSING OXIDES OF NITROGEN

[75] Inventor: Erich Hums, Hessdorf, Germany

[73] Assignee: Siemens Aktiengesellschaft, Munich, Germany

[21] Appl. No.: 876,763

[22] Filed: Jun. 16, 1997

Related U.S. Application Data

[63] Continuation of Ser. No. 539,844, Oct. 6, 1995, abandoned, which is a continuation-in-part of Ser. No. 250,280, May 27, 1994, abandoned.

[30] Foreign Application Priority Data

May 27, 1993 [DE] Germany ............ 43 17 581.3

[51] Int. Cl.$^6$ ..................................... C01B 21/00
[52] U.S. Cl. ........................ 423/239.1; 423/235
[58] Field of Search ............... 423/235, 239.1; 502/80, 75; 422/171

[56] References Cited

U.S. PATENT DOCUMENTS

| | | | |
|---|---|---|---|
| 3,901,826 | 8/1975 | Hofstadt et al. | 252/450 |
| 4,001,028 | 1/1977 | Frost et al. | |
| 4,621,070 | 11/1986 | Pinnavia et al. | 502/63 |
| 4,692,425 | 9/1987 | Schneider et al. | 502/81 |
| 4,719,192 | 1/1988 | Schneider et al. | 502/84 |
| 4,722,918 | 2/1988 | Schneider et al. | 502/81 |
| 4,749,808 | 6/1988 | Ballantine et al. | |
| 4,786,484 | 11/1988 | Nelson . | |
| 4,806,718 | 2/1989 | Seaborne et al. | |
| 4,869,890 | 9/1989 | Adams et al. | 423/392 |
| 4,880,378 | 11/1989 | Hums | 431/170 |
| 4,995,964 | 2/1991 | Gortsena et al. | 208/112 |
| 5,078,981 | 1/1992 | Kagawa et al. | |
| 5,089,458 | 2/1992 | Breukelaar et al. | |
| 5,110,363 | 5/1992 | Clarke et al. | |
| 5,137,703 | 8/1992 | Lichtin et al. | |
| 5,234,631 | 8/1993 | Kakuta et al. | |

FOREIGN PATENT DOCUMENTS

| | | |
|---|---|---|
| 0 445 816 | 9/1991 | European Pat. Off. . |
| 4-118050 | 9/1990 | Japan . |
| 3-207448 | 9/1991 | Japan . |
| 3-221143 | 9/1991 | Japan . |
| 3-267151 | 11/1991 | Japan . |
| 4-35747 | 2/1992 | Japan . |

OTHER PUBLICATIONS

Chemistry Letters 1988, pp. 1796–1801, "Decomposition of Nitric Oxide over Y–Ba–Cu–O Mixed Oxide Catalysts".
Chemistry Letters 1989, pp. 213–216, "Excessively Copper Iron–exchanged ZSM–5 Zeolites as Highly . . . ".
Chemistry Letters 1990, pp. 1–4, "Catalytic Activity of Perovskite–Type xides for the Direct Decomposit . . . ".
Elsevier Science Publishers B.V. Publ. Catalysis Today 1991, pp. 57–71, "Removal of Nitrogen Monoxide . . . ".
Elsevier Science Publishers B.V. Publ. Appl. Catalysis A:General 85 (1992) pp. 129–133, "Catalytic decomp . . . ".

*Primary Examiner*—Deborah Jones
*Attorney, Agent, or Firm*—Herbert L. Lerner; Laurence A. Greenberg

[57] ABSTRACT

In order to achieve a high degree of conversion, oxides of nitrogen are contacted with a catalyst containing an aluminum silicate having a three-sheet structure as a catalytically active component at a temperature between 100° C. and 700° C. With this type of catalyst, the decomposition of the oxides of nitrogen proceeds without the presence of a reducing agent. Additionally, the degree of decomposition for the oxides of nitrogen is not adversely affected by the oxygen present in the flue gas. Degrees of decomposition greater than 60% were achieved with this catalyst in the temperature range between 200° C. and 600° C. The catalysts of the invention can replace the previous catalysts, which use a reducing agent, for decreasing the amount of oxides of nitrogen in waste gases, for example in flue gas and exhaust gas purification in power stations and combustion engines, respectively.

25 Claims, 2 Drawing Sheets

5,744,113

PROCESS AND CATALYST FOR DECOMPOSING OXIDES OF NITROGEN

CROSS-REFERENCE TO RELATED APPLICATION

This application is a continuation of application Ser. No. 08/539,844, filed on Oct. 6, 1995, now abandoned, which was a continuation-in-part of application Ser. No. 08/250, 280, filed May 27, 1994, now abandoned.

BACKGROUND OF THE INVENTION

Field of the Invention

The invention relates to a process and a catalyst for decomposing oxides of nitrogen, particularly NO and $N_2O$, in waste gases such as flue gases of incineration plants, for example. It is preferably used in flue gas and exhaust gas purification in a power station and a combustion engine, respectively. Oxides of nitrogen are formed essentially when oxygen and nitrogen come into contact with one another at temperatures above 600° C., for instance during combustion. The oxides formed in that case are predominantly $N_2O$ and NO and small amounts of $NO_2$ and $NO_3$. Since the permitted emission of oxides of nitrogen is severely restricted by emission laws in individual countries, primary and even secondary measures are used to limit the content of the oxides of nitrogen in flue gases.

Primary measures are those measures in which the formation of oxides of nitrogen is largely suppressed from the beginning. These include the operation of incineration plants with pure oxygen or the lowering of the flame temperature by mixing incineration waste gases and other inert gases into the combustible gas.

Secondary measures are measures in which the oxides of nitrogen ($NO_x$) that are already present in the flue gas are decreased. Those include measures such as scrubbing the oxides of nitrogen from the flue gas or reducing the oxides of nitrogen by the SCR (Selective Catalytic Reduction) process. In the latter process, a reducing agent, preferably ammonia, which is added to the flue gas, converts the oxides of nitrogen in the presence of oxygen and a catalyst into nitrogen and water. The catalyst which is used in that case is titanium oxide with additions of vanadium oxide and/or molybdenum oxide and/or tungsten oxide. At present, the SCR process has become established worldwide. However, because of the use of ammonia as a reducing agent, it has the disadvantage of requiring complicated control technology to exactly match the stoichiometric ammonia requirement to the current $NO_x$ content of the waste gases. In addition, the ammonia together with $SO_3$ present in the flue gas can form ammonium salts which condense out at temperatures below 290° C., depending on the $SO_3$ concentration, and thus lead to sticking together and blocking of downstream components. The use of the ammonia reducing agent is associated with strict conditions for a regulation ammonia storage vessel and an ammonia stock, and is therefore likewise expensive. It is furthermore known that NO and $N_2O$ can be catalytically decomposed even without the use of reducing agents. Thus it has been found that certain copper-containing zeolites, for example Cu—Z-143, have the property of decomposing NO into $N_2$ and $O_2$ (albeit with an unsatisfactory degree of conversion) at temperatures above 300° C. without a reducing agent being required for that purpose (see, for example, an article by M. Iwamato, H. Yahiro, Y. Mine and B. Kagawa in Chemistry Letters 1989, 214). Zeolite catalysts of the material basis Cu/ZSM-5 likewise give unsatisfactory yields for the decomposition of NO. It is also a disadvantage that for those catalysts the presence of oxygen lowers the yield. Furthermore, other catalyst systems are also known in the literature, for example metal oxides of the perovskite type, such as lanthanum—strontium—iron oxide ($La_{0.8}Sr_{0.2}FeO_3$) and lanthanum—strontium—cobalt oxide ($La_{0.8}Sr0.2CoO_3$), as well as lanthanum—strontium—cobalt—iron oxides ($La_{0.8}Sr_{0.2}Co_{0.8}Fe_2O_3$), which decompose NO at temperatures above 550° C. (see an article by Y. Teraoka, H. Fukuda and S. Kagawa in Chemistry Letters 1990, 1).

Decomposition of NO is also observed over compounds of the type Y—Ba—Cu—O, which are applied onto MgO for that purpose.

They are preferably used at 800° C. Those catalysts are supposed to be superior to the catalysts using platinum as the catalytic component (see an article by H. Shimada, S. Miyama and A. Kuroda in Chemistry Letters 1988, p. 1797). In that context, reference is also made to U.S. Pat. No. 5,137,703, which discloses the use of a catalyst including a noble metal and a metal selected from the group including the transition metals and rare earth metals to decompose $NO_x$ without a reducing agent. Furthermore, Published European Application No. 0 445 516 discloses the use of a catalyst for the same purpose, including a zeolite having a molar ratio of $SiO_2/Al_2O_3$ of at least 20 and copper ions as well as ions of transition metals. However, even with these catalysts, the degree of decomposition for NO leaves something to be desired.

Only a small number of studies are concerned with the decomposition of $NO_2$ over $CuO/Al_2O_3$, $CeO_2/Al_2O_3$, $Co_3O_4/MgO$ and other catalyst systems (see M Shimokawabe, A. Ohi, N. Takeza in Applied Catalysis A., Vol. 85 (1992), 129). Further $NO_x$ decomposition catalysts are known from the following publications:

1. T. Imai et al. (Mitsubishi Heavy Industries) Catalysts for Decomposing Nitrogen Oxides in Flue Gases, Published Japanese Application No. 04 035 747, Feb. 6, 1992;
2. M. Iwamoto et al. (Hokkaido University, Sapporo) Removal of NO from Exhaust Gases Through Novel Catalytic Processes, Catalysis Today 10 (1991) 57;
3. S. Kagawa et al. (Tosoh Corporation) Catalyst and Method for Catalytically Decomposing Nitrogen Oxides, Published European Application No. EP 0 445 816, Sep. 11, 1991;
4. K. Kaneko et al. (Osaka Gas Co. Ltd.) Decomposition Catalyst and Method for Removing Nitrogen Oxides from Waste Gases, Published Japanese Application No. 03 207 448, Sep. 10, 1991;
5. N. N. Lichtin et al. (Boston University) Thermal Catalytic Methods for Converting Oxides of Nitrogen into Environmental Compatible Products, U.S. Pat. No. 5,137,703, Aug. 11, 1992;
6. I. Matsura (Nippon Shokubai K.K.) Nitrogen Oxide Decomposition Catalysts, Published Japanese Application No. 04 118 050, Sep. 7, 1990;
7. A. Ogata et al. (Agency of Industrial Science and Technology) Waste Gas Treatment Catalyst Published Japanese Application No. 03 221 143, Sep. 30, 1991; and
8. K. Yamashita et al. (Toyota Motor Corporation) Manufacture of Waste Gas Treatment Catalysts, Published Japanese Application No. 03 267 151, Nov. 28, 1991.

The catalyst systems cited herein have at least the following deficiency: they only possess low No decomposition activities and are sensitive to oxygen, the presence of which results in a decrease in the conversion rate.

Many clays contain aluminum silicates with a three-sheet structure, in particular talc, and they serve as starting materials for ceramics in many different uses. The clays are thereby baked at high temperatures so as to achieve the desired characteristics, be it mechanical, electrical, optical, and/or thermal properties. Generally, the clays are fired at above 1000° C. so as to change the crystal structure thereof and to attain the desired characteristics.

For instance, U.S. Pat. No. 4,001,028 to Frost et al. discloses a process in which clay (including talc) as the starting material is fired at 1000° C. or above. There is obtained a material which is virtually exclusively cordierite and which is particularly temperature independent, i.e. crack-free. The material is used as a substrate for the catalytic conversion of hydrocarbon, carbon monoxide, and nitrogen oxides in the exhaust gas of motor vehicles where the catalytic converter formed with that substrate is exposed to such elevated temperatures.

SUMMARY OF THE INVENTION

It is accordingly an object of the invention to provide a catalyst, a vent duct with such a catalyst, and a corresponding catalytic process for decomposing oxides of nitrogen without a reducing agent, which overcome the hereinaforementioned disadvantages of the heretofore-known methods and products of this general type. The oxygen sensitivity of known reduction processes is also to be decreased.

With the foregoing and other objects in view there is provided, in accordance with the invention, a catalyst for decomposing oxides of nitrogen, comprising means for catalytically decomposing oxides of nitrogen, which means are an aluminum silicate having a three-sheet structure.

With the above and other objects in view there is also provided a process for decomposing oxides of nitrogen, in particular NO and $N_2O$, in waste gases, which comprises contacting oxides of nitrogen at a temperature between 100° C. and 700° C., preferably between 200° C. and 600° C., with a catalyst containing an aluminum silicate having a three-sheet structure.

The term three-sheet structure in this case means a construction which is comparable to a structure of sheets of paper stacked on top of one another. In the aluminum silicates of the present invention, this structure is repeated after each third layer.

This stereometric structure is conventionally described in that the silicon and aluminum atoms are associated with structural groups and chemical bonds, particularly oxygen bridges. These structural groups and chemical bonds spatially connect the atoms and the three layers (sheets) in the particular and specific manner. Other elements (e.g. magnesium) can thereby form part of these bonds as well. The three-sheet structure shows also locations where cation complexes of metals are embedded by other chemical interactions, for instance a van der Waal bond.

In accordance with an added feature of the invention, the aluminum silicate having a three-sheet structure is selected from the group consisting of vermiculite, phlogopite, muscovite, pyrophyllite, talc, saponite, and montmorillonite.

The preferred such aluminum-silicates are vermiculite and talc, which can be produced by cleaning natural substances or synthetically. According to the invention, they may be used directly as catalysts (i.e. as catalytically active material) or they may serve as starting materials (at least as a reference structure for similar materials with complex substitutions). In individual structural groups which atoms bound to aluminum atoms via oxygen bridges, or with embedded metal cation complexes, selected other atoms or complexes are substituted.

When these materials are used as the catalytically active components in a non-reducing flue gas, the oxides of nitrogen that are present in the flue gas are decomposed catalytically and without a reducing agent, into oxygen and nitrogen with a particularly high degree of conversion. The disadvantages associated with the use of reducing agents, such as the costs of the reducing agent and the costs for the associated storage equipment, can thereby be avoided.

With the objects of the invention in view, there is also provided a catalyst for decomposing oxides of nitrogen, comprising an aluminum silicate having a three-sheet structure as a catalytically active component. As a result of this structure, such silicates have good catalytic properties for the decomposition of NO and $N_2O$ in a non-reducing atmosphere.

In accordance with another feature of the invention, vermiculite is used as the silicate having a three-sheet structure. Vermiculite has the property of decomposing both NO and $N_2O$ with a high degree of effectiveness in the given temperature range, in particular at temperatures above 200° C.

In accordance with a further feature of the invention, in order to increase the catalytic activity even further, in these aluminum silicates having a three-sheet structure those structural groups which are bound to aluminum atoms through oxygen bridges are substituted by other structural groups which are only insignificantly different in size from the substituted structural groups. For this purpose, use should be made of those structural groups which do not destroy the crystal structure of the aluminum silicate as a result of the substitution. In magnesium-containing structures like vermiculite, it is mainly the magnesium structural group which is partially or completely substituted. In this way, structural groups which have a less favorable effect in decomposing the oxides of nitrogen can be replaced by more active or at least neutral structural groups.

In accordance with an added feature of the invention, particularly good catalytic properties can be expected if magnesium (Mg) is substituted by at least one element of the subgroups 1 to 8 of the Periodic Table of the Elements such as, for example, manganese (Mn) or zinc (Zn). Preferably, the synthesis paths for zeolites are used as a guide to the substitution of the structural groups. The treatment of the aluminum silicates is preferably carried out in a strongly acid or strongly alkaline reaction mixture to increase the reactivity of the structural groups of the elements of the subgroups 1 to 8 of the Periodic Table of the Elements which are to be substituted. The substitution can generally be carried out at from 60° to 100° C. It is only for the $SiO_2$-rich systems that the reaction is carried out at higher temperatures in autoclaves. The end of the reaction can be determined by X-ray diffraction.

In accordance with yet another feature of the invention, the complexes of magnesium (Mg) which are intercalated in the aluminum silicate lattice are washed out and they are replaced by at least one of the elements of the main group II of the Periodic Table of the Elements, for example calcium (Ca), and/or at least one of the elements of the subgroups 1 to 8 of the Periodic Table of the Elements, for example zinc (Zn), cobalt (Co) or cadmium (Cd). These exchange atoms are likewise bound as complexes to the sites vacated by the washing out of the Mg complex. The catalytic activity can thereby be favorably influenced.

With the above objects in view, there is also provided a catalyst of the above described system in combination with a vent for a waste gas stream containing oxides of nitrogen.

The combination includes a catalyst for decomposing the oxides of nitrogen disposed in a chamber formed in the vent, the catalyst comprising a catalytically active component which is aluminum silicate having a three-sheet structure, the catalyst being in contact with the waste gas stream at a given contact temperature, and means operatively associated with the vent for maintaining the given contact temperature between 100° C. and 700° C., and particularly between 200° C. and 600° C.

Finally, there is provided, in accordance with a concomitant feature of the invention, a novel method of decomposing oxides of nitrogen, which comprises the step of contacting gases containing oxides of nitrogen with a catalyst comprising: a catalytically active component in the form of an aluminum silicate having a three-sheet structure. The lo catalyst used in the novel method may also exclusively consist of the above-noted aluminum silicate.

Since, for example, the magnesium complex bound by van der Waal forces in vermiculite is relatively weakly bound, it can be exchanged comparatively easily. This permits a relatively wide range of modifications of the aluminum silicate. The properties of the catalyst which is thus produced can be strongly influenced thereby. This possibility of exchanging the cations essentially depends on the type of cations, the reaction temperature, the cation concentration and the structure of the aluminum silicate. The course of the exchange can be followed by means of the exchange isotherms and is very conspicuously distinguished by the affinity of the ions to be exchanged.

Other features which are considered as characteristic for the invention are set forth in the appended claims.

Although the invention is illustrated and described herein as embodied in a process and a catalyst for decomposing oxides of nitrogen, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Initially, it is noted that in the production of a catalyst which includes an aluminum silicate having a three-sheet structure as a catalytically active component, a distinction has to be made in principle between an exchange of metal complexes bound by a van der Waal bond and a substitution of covalently bound metal cations (covalent bond).

Figure 1:
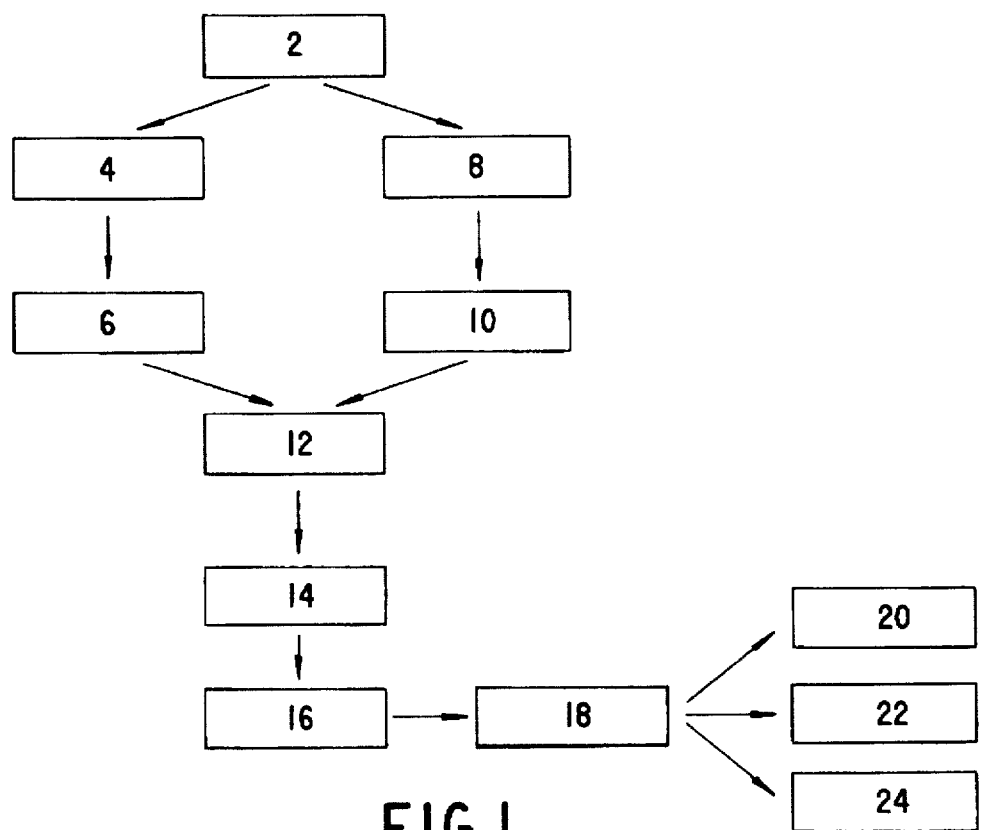
FIG. 1 is a flow diagram of a production process of a catalyst for flue-gas purification in a power station.

Referring now to the figures of the drawing in detail and first, particularly, to FIG. 1 thereof, it is seen that in a first process step 2, a vermiculite, for example, is prepared so as to be subsequently placed in a strongly acid suspension in a process step 4 or in a strongly alkaline suspension in a process step 8. A substitution of magnesium cations which are relatively strongly covalently bonded to the crystal lattice in vermiculite takes place, depending on the substituting atom, in the strongly acid suspension or the strongly alkaline suspension. For example, in order to substitute the magnesium with manganese, the vermiculite is treated in the strongly acid suspension with 0.1 to 1 normal manganic acid in a process step 6. In contrast thereto, in a substitution of zinc for the magnesium, an alternative process step 10 has to be carried out in the strongly alkaline suspension, with zinc hydroxides then being added to the strongly alkaline suspension. In both cases, the end of the reaction, i.e. sufficient substitution of the magnesium with the specified metal cations, can be determined by X-ray diffraction. These substitutions are carried out at temperatures around 80° C.

The octahedral hydroxomagnesium complexes present in the vermiculite can be exchanged for such complexes of zinc, cobalt or cadmium, in acid or alkaline aqueous suspensions. For this purpose, in a process step 12, these metals are added in the form of salts, such as hydroxides or nitrates, to the acid or alkaline suspension. The course of this exchange can be followed by means of the known exchange isotherms. In the case of vermiculite, the rate of this exchange essentially depends on the excess affinity of the exchanging cation in comparison with the cation to be exchanged, in this case magnesium.

It is to be emphasized that an exchange reaction with metals in the form of salts and/or a substitution reaction with manganic acid and/or with zinc hydroxide takes place both in an acid suspension and in an alkaline suspension. After the exchange reaction and/or substitution reaction are complete, the vermiculite thus obtained is dried in a process step 14 at about 150° C. and is subsequently calcined in a process step 16 at a temperature between 400° and 500° C. for a few hours. Subsequently, an aluminum silicate having a three-sheet structure obtained in this way, in this case vermiculite, is milled in a process step 18 and is admixed with additives. Subsequently, in a process step 20, it is applied to an oxidic support, such as magnesium oxide, titanium oxide or silicon oxide, for example. The aluminum silicate having a three-sheet structure which is thus obtained can just as well be treated and mixed with film-binding aids, dispersing aids and pore formers and be extruded into catalyst honeycombs, in a process step 22. As an alternative thereto, it is also possible to apply the aluminum silicate having a three-sheet structure which is thus obtained, to a metallic support, such as to a perforated steel sheet, an expanded metal or a woven metal, preferably of stainless steel, for example, in a process step 24.

These three alternative final catalyst products have in common that the oxides of nitrogen contacted with these catalysts are catalytically converted into nitrogen and oxygen without a reducing agent being introduced into a flow medium containing oxides of nitrogen.

Figure 2:
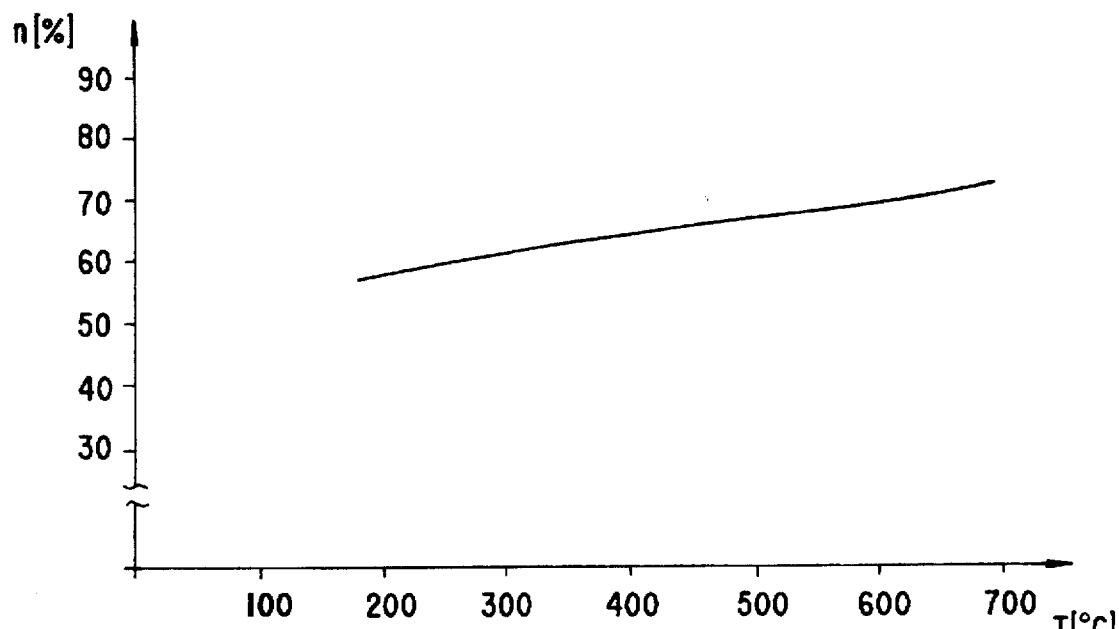
FIG. 2 is a diagram showing the degree of conversion of a catalyst produced according to the flow diagram of FIG. 1, as a function of temperature.

By means of a graph, FIG. 2 shows the typical course of a catalytic degree of conversion η as a function of temperature T. This is based on measurements on a vermiculite catalyst which has been produced in the manner described above. It can be seen from FIG. 2, that the catalytic degree of conversion η between 250° and 550° C. only rises slightly with the temperature T. As a great improvement in comparison with the prior art, FIG. 2 shows that degrees of conversion of 60% and more can be achieved for oxides of nitrogen, preferably for NO and $N_2O$, by using this new catalyst operating without a reducing agent.

The measured curve shown in FIG. 2 was recorded under the following detailed conditions: on the inlet side, a test gas mixture contained 450 ppm of NO, 15% by volume of $CO_2$ and 4% by volume of $O_2$ and was made up to 100% with nitrogen. The pressure of the test gas mixture was 1 bar and the operating space velocity in the catalyst was 10,000/h.

Further tests have shown that, besides vermiculite, the aluminum silicate having a three-sheet structure that is used can also be phlogopite, muscovite, pyrophyllite, talc, saponite or montmorillonite.

Figure 3:
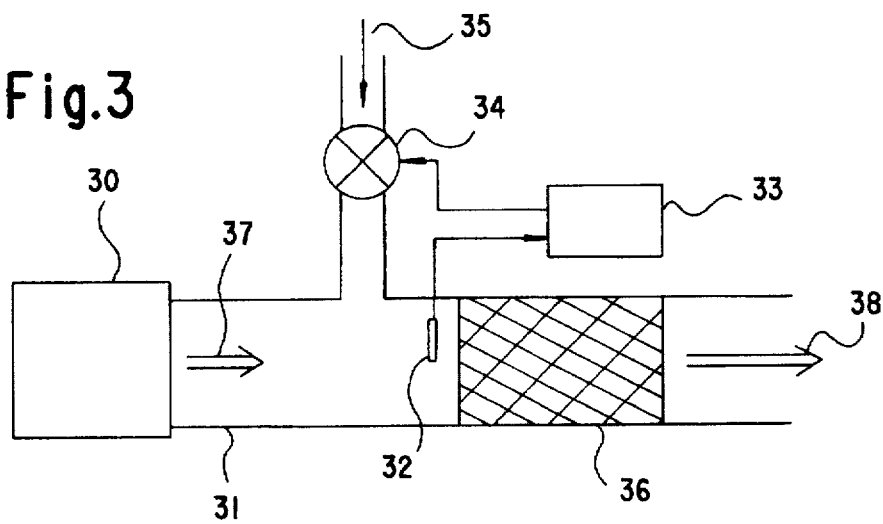
FIGS. 3–5 are diagrammatic views of an exemplary vent duct for exhaust gases with a catalyst according to the invention.
Figure 4:
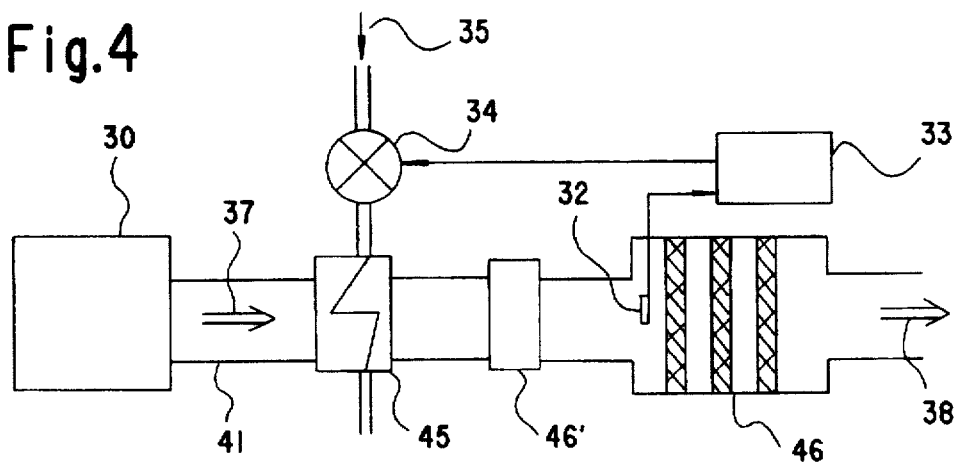
Figure 5:
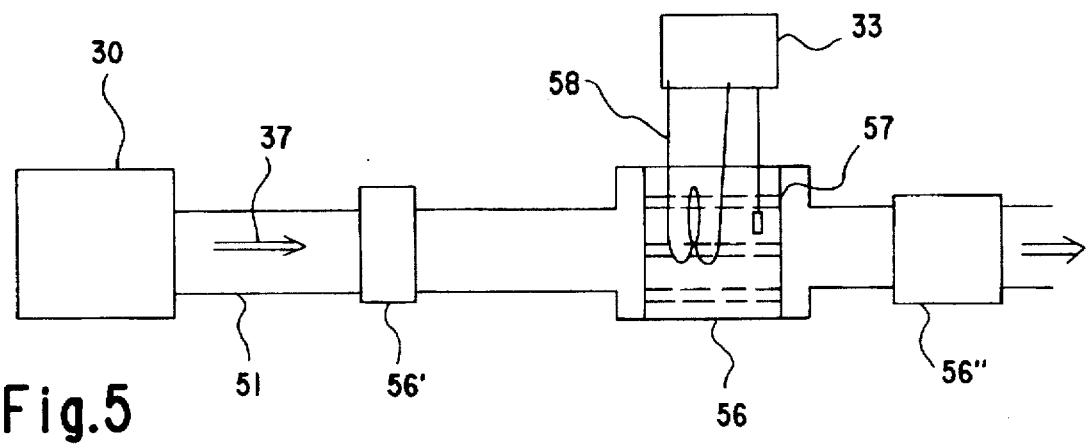

Referring now to FIGS. 3–5, there is illustrated a combustion device 30. Exhaust gas 37 from the combustion device 30 is guided through a vent or exhaust gas line (e.g. a flue, an exhaust pipe, etc.), in which it is brought into contact with a catalytic converter, i.e. a catalyst according to the invention. The vent is provided with means which allow maintaining a contact temperature at which the exhaust gas contacts the catalyst to between 200° and 700° C. (preferably below 600° C.). These means comprise a temperature probe or temperature sensor 32, the output signal of which is supplied to a control apparatus 33. The control apparatus 33 regulates the contact temperature.

The exhaust gas stream 37 generally constitutes an oxidizing atmosphere, because its composition is determined by the combustion environment in the combustion device 30 and it contains only a limited amount (usually below 100 ppm) carbon monoxide and other reducing substances. FIGS. 4 and 5 illustrate an example in which the exhaust gas stream is directly conducted to the catalytically active surface of the catalytic converter. In FIG. 3 the exhaust gas 37 is admixed cold air 35 through a metering valve 34, which is regulated by the control device 33. A chamber 36 is filled with a fill of small pebbles of the above-described catalyst material. The nitrogen oxides contained in the oxidizing atmosphere are catalytically decomposed in the chamber 36.

If the exhaust line 31 between the combustion device 30 and the catalyst chamber 36 is embodied such that the exhaust gas cools significantly, then it is possible to feed in non-reducing hot gas instead of the cold air 35. In neither case, however, is there a separate reducing agent admixed to the exhaust gas so that the catalyst is contacted by gas which is virtually non-reducing (i.e. not more reducing than dictated by the combustion process in the device 30).

With reference to FIG. 4, the temperature is adjusted by using at least a portion of the combustion air to be supplied to the combustion device 30. The combustion air is thereby guided through a heat exchanger 45, and the valve 34 throttles the gas appropriately. In a first situation, in which the catalytic converter is started from cold, the gas is throttled to such an extent that the temperature measured by the sensor 32 in the catalyst chamber 46 reaches and exceeds a predetermined minimum contact temperature as quickly as possible (e.g. 200° C. or more). In the steady state combustion situation, the gas is throttled such that the maximum temperature (e.g. 700° C.) is not exceeded. In addition, there is provided between the combustion device 30 and the catalyst chamber 46 a further cleaning device 46' (e.g. desulfurizing device and/or a dust and soot filter).

The catalyst chamber 46 is thereby provided with several steal grids which are mutually stacked in series, which grids (or nets) are coated with the catalyst material of the invention, and which extend across substantially the entire flow cross section.

With reference to FIG. 5, there is disposed in the exhaust gas line 51 between the combustion device 30 and the catalyst chamber 56 a first, additional cleaning device 56' (e.g. a desulfurizing device). The effect is that the exhaust gas cools down sufficiently (accordingly, it may also be a non-regulated heat exchanger for preheating the combustion air). A second, additional cleaning device—e.g. a further device 56" for desulfurizing the exhaust gases—may be disposed downstream of the catalyst chamber 56, as seen in the exhaust gas flow direction.

The catalyst chamber 56 hereby houses a ceramic honeycomb body or a monolith with the inventive catalyst. The exhaust gas thereby flows through channels 57 formed in the honeycomb body. The temperature probe 57 thereby measures the temperature of the honeycomb body. An electrical auxiliary heater 58 heats the honeycomb body very quickly if the system is started from cold (or it may preheat the catalytic carrier body so that, upon the arrival of the first exhaust gas, the catalyst is already at light-off temperature). With the heater 58 it is further assured that the catalyst temperature never falls below the predetermined minimum contact temperature during operation.

The cleaned exhaust 38 which exits at the exhaust now contains a mixture of nitrogen gas and oxygen formed by the catalytic decomposition in the catalytic converter of the nitrogen oxides NO and $NO_2$ arriving with the exhaust gas 37 from the combustion device 30.

I claim:

1. A method of decomposing oxides of nitrogen, which comprises contacting gases containing oxides of nitrogen with a catalyst comprising a catalytically active component which is an aluminum silicate having a three-sheet structure, and catalytically decomposing the oxides of nitrogen into nitrogen and oxygen substantially without a reducing agent.

2. The method according to claim 1, wherein the contacting step comprises contacting the gases with the aluminum silicate at a contact temperature of between 200° C. and 600° C.

3. A method of decomposing oxides of nitrogen, which comprises contacting gases containing oxides of nitrogen with a catalyst consisting essentially of a catalytically active component which is an aluminum silicate having a three-sheet structure, and catalytically decomposing the oxides of nitrogen into nitrogen and oxygen substantially without a reducing agent.

4. The method according to claim 3, wherein the contacting step comprises contacting the gases with the aluminum silicate at a contact temperature of between 200° C. and 600° C.

5. The method according to claim 1, which comprises wherein selecting the aluminum silicate having the three-sheet structure is selected from the group consisting of vermiculite, phlogopite, muscovite, pyrophyllite, talc, saponite, and montmorillonite.

6. The method according to claim 1, which comprises substituting, at least one of the structural groups of the starting aluminum silicate by another structural group which fits into the three-sheet structure without substantially changing its stereometric dimensions.

7. The method according to claim 6, which comprises selecting a reference aluminum silicate with at least one of the structural groups containing magnesium.

8. The method according to claim 7, which comprises substituting at least a part of the magnesium of the reference aluminum silicate with at least one element of the subgroups 1 to 8 of the Periodic Table of the Elements.

9. The method according to claim 7, which comprises substituting at least a part of the magnesium of the reference aluminum silicate with manganese.

10. The method according to claim 7, which comprises substituting at least a part of the magnesium of the reference aluminum silicate with zinc.

11. The method according to claim 1, which comprises at least partially exchanging a first metal cation complex of a metal of the main group II of the periodic table of elements with a second metal cation complex.

12. The method according to claim 11, which comprises selecting, as the second metal cation complex, a complex of at least one other element of the elements of the main group II of the periodic table of the elements.

13. The method according to claim 11, wherein the second metal cation complex is a complex of calcium.

14. The method according to claim 11, wherein the second metal cation complex is selected from the group consisting of elements of the subgroups 1 to 8 of the Periodic Table of the Elements.

15. The method according to claim 11, which comprises selecting the second metal cation complex as a complex of at least one of the elements selected from the group consisting of zinc, cobalt and cadmium.

16. The method according to claim 11 which comprises partly exchanging the first metal cation complex for a complex of at least one other element of the elements of the main group II of the Periodic Table of the Elements and partly exchanging the first metal cation complex for a complex of at least one of the elements of the subgroups 1 to 8 of the Periodic Table of the Elements.

17. The method according to claim 1, wherein the gases are contacted with an oxidic support on which the aluminum silicate having the three-sheet structure is disposed.

18. The method according to claim 17, which comprises wherein the oxidic support is selected from the group consisting of MgO, $TiO_2$ and $SiO_2$.

19. The method according to claim 1, wherein the gases are contacted with a metal support on which the aluminum silicate having the three-sheet structure is disposed.

20. The method according to claim 19, the metal support is selected from the group consisting of perforated sheet steel, expanded metal and woven metal.

21. The method according to claim 19, wherein the metal support is selected from the group consisting of perforated sheet steel, expanded metal and woven metal formed of stainless steel.

22. The method according to claim 1, which further comprises supplementing the aluminum silicate having the three-sheet structure with an additional material and processing the supplemented aluminum silicate into a ceramic honeycomb body.

23. The method according to claim 1, which further comprises: conducting a waste gas containing the oxides of nitrogen through a vent, placing the catalyst in a chamber formed in the vent, and maintaining a contact temperature at which the catalyst contacts the waste gas between 100° C. and 700° C.

24. The method according to claim 23, wherein the contact temperature is maintained between 200° C. and 600° C.

25. A waste gas cleaning method, which comprises: contacting a waste gas which contains oxides of nitrogen with a catalytically active component consisting essentially an aluminum silicate having a three-sheet structure, and catalytically decomposing the oxides of nitrogen into nitrogen and oxygen substantially without a reducing agent.

* * * * *